US005315757A

United States Patent [19]

Koch et al.

[11] Patent Number: 5,315,757

[45] Date of Patent: May 31, 1994

[54] APPARATUS FOR FITTING OF GROMMETS TO ELECTRICAL CABLES

[75] Inventors: Max Koch, Meggen; Peter Imgrut, Buchrain, both of Switzerland

[73] Assignee: Komax Holding AG, Meggen, Switzerland

[21] Appl. No.: 951,112

[22] Filed: Sep. 25, 1992

[30] Foreign Application Priority Data

Sep. 25, 1991 [CH] Switzerland ........................ 2838/91

[51] Int. Cl.[5] ........................................ B23P 19/04

[52] U.S. Cl. ........................................ 29/754; 29/743

[58] Field of Search ................. 29/235, 450, 451, 464, 29/717, 747, 748, 754, 786, 792, 793, 785, 743; 174/65 G

[56] References Cited

U.S. PATENT DOCUMENTS

| | | | |
|---|---|---|---|
| 2,683,924 | 7/1954 | Schryver | 29/754 |
| 3,349,891 | 10/1967 | Burgess . | |
| 3,802,071 | 4/1974 | Shannon | 29/450 X |
| 3,807,021 | 4/1974 | Birkett | 29/754 |
| 4,170,289 | 10/1979 | McDonald et al. | 29/785 X |
| 4,480,382 | 11/1984 | Haigh et al. | 29/792 X |
| 4,653,182 | 3/1987 | Fukuda et al. | 29/754 |
| 4,765,052 | 8/1988 | Fukuda et al. | 29/809 X |
| 5,016,346 | 5/1991 | Gerst et al. | 29/450 X |

FOREIGN PATENT DOCUMENTS

| | | |
|---|---|---|
| 0159006 | 11/1985 | European Pat. Off. . |
| 0290721 | 11/1988 | European Pat. Off. . |
| 0410416 | 1/1991 | European Pat. Off. . |
| 8909515.4 | 1/1991 | Fed. Rep. of Germany . |

OTHER PUBLICATIONS

"Bush fitting module", Publication No. 7.132.1 of Komax AG, Dierikon, Switzerland, Jul. 1991.

*Primary Examiner*—Peter Dungba Vo

*Attorney, Agent, or Firm*—Sandler Greenblum & Bernstein

[57] ABSTRACT

An apparatus for fitting of grommets onto ends of electric cables. The shape of the grommet is independent of the manner in which it is fitted, by which it is pushed onto an electrical cable, and the characteristics of the electrical cable is not important for the exact positioning of the grommet. For this purpose, a conveying rail of a feed apparatus includes a buffer, in which the grommets are stored in correct position. In alignment with the axis of a vertical bore arranged below the first grommet in the buffer, a singling cylinder with a punch, which is movable up and down, is arranged above the conveying rail and a pivotable fitting cylinder with a grommet-receiving part positioned on a piston rod is arranged beneath the conveying rail, wherein the grommet is pushed by means of the punch through the vertical bore into the grommet-receiving part and the fitting cylinder is pivoted into a horizontal position. Pivotable gripper elements thereafter surround and hold the grommet-receiving part and are moved together with the piston rod against the cable, while the grommet is pushed onto the cable and its position thereon is assisted by an excess pressure that builds up in the grommet-receiving part.

16 Claims, 6 Drawing Sheets

APPARATUS FOR FITTING OF GROMMETS TO ELECTRICAL CABLES

BACKGROUND OF THE INVENTION

1. Field of the Invention

The present invention relates to apparatus or equipment for the fitting of grommets to cables, electrical cables in particular. The apparatus includes at least one drum which is open at one end face, the interior of the drum containing grommets, and which is drivable about an axis inclined to the horizontal, having scoops or similar grommet-holding elements arranged in the interior of the drum and a feed device projecting into the drum, whereby, while the drum is rotating, the grommets are transferred by means of the scoops to the feed device for the purpose of further processing in accordance with the invention.

2. Description of Background and Material Information

By means of apparatus of the type to which the present invention is directed, grommets, which are typically made of rubber or other elastomeric material, are required, for example, for the feeding of electrical cables through housing walls of electrical appliances, can be conveyed and worked upon in an orderly manner.

In an apparatus which is known from printed publication No. 7.132.1, of July 1991, by the firm of KOMAX AG, of Dierikon, Switzerland, the feeding of grommets, bushes, or bushings, takes place through conveying pots or drums with spirally shaped tracks, for which the grommets must often be chalked, which can lead to contamination and for which different conveying drums are required for each type of grommet. For the purpose of fitting a grommet onto the end of a cable, the grommet is firmly retained in a gripper and the cable is pushed into the grommet bore. Generally, good results are achieved thereby, although it can lead to a large variations in the grommet position on the cable in the case of different properties of the cable, such as insulation diameter and surface properties, for example. Furthermore, only the grommets themselves allowed to be processed, which by reason of their shape and dimensions are retained and supported unobjectionably by the gripper.

Another kind of fitting is described in German Utility Model No. G 89 09 515.4. In this case, a plunger pin is pushed into the bore of a sealing plug retained in a pivotal finger. Thereafter, a plunger sleeve, which is arranged for sliding on the plunger pin, pushes the sealing plug from the plunger pin onto an electrical cable. In this method, certain demands are made on the shape and dimensions of the sealing plugs, since a sufficiently large bearing surface must be available.

An apparatus by means of which identically shaped parts can be brought into a certain position required for further processing has become known by U.S. Pat. No. 3,349,891. In this case, a supply drum is provided in which the identically shaped parts are disposed and which can be driven about an axis inclined to the horizontal. A rail, which is likewise inclined to the horizontal, is arranged in the supply drum and is constructed in such a manner that, upon rotation of the supply drum, a number of parts are collected by the rail and remain suspended in the desired position. By reason of gravitational force, the parts slide off of the rail and, bridging an air gap, are caught by a conveying tube always with the same end forward.

SUMMARY OF THE INVENTION

An object of the present invention is to create a new and improved apparatus that is not afflicted with the disadvantages arising through conveying drums with spirally shaped tracks and in which the grommets can be provided in a shape independent of the kind of fitting, and in which the property of the cable is not important for the exact positioning of the grommet.

In order to implement these and still further objects of the present invention, which will become more readily apparent as the description proceeds, the present invention comprises an apparatus for the fitting of grommets to cables, in which the apparatus comprises a feeding arrangement for feeding grommets to a fitting arrangement. The feeding arrangement comprises a conveying rail having an upstream portion and a downstream portion, the conveying rail conveying grommets from an upstream to a downstream direction. The conveying rail further comprises a buffer for storing grommets that are each oriented in a predetermined correct position for subsequent sequential processing of respective grommets by means of the fitting arrangement. At a downstream end portion of the conveying rail is a grommet transfer guide, such as a vertical bore, adjacent a position in which a first, most downstream, grommet is stored in the buffer, for guiding the most downstream grommet as the grommet is transferred from the conveying rail to the fitting arrangement.

The fitting arrangement includes a grommet singling device for sequentially removing a most downstream grommet from the grommet transfer guide; a grommet transfer device for sequentially transferring a respective grommet, upon removal from the buffer, to a grommet fitting station, the grommet transfer device comprising a grommet-receiving part upon which a grommet is receive and held during the transferring by the transfer device; and a first gripper device located at the grommet fitting station, the first gripper device comprising gripper elements for gripping the grommet-receiving part of the grommet-transfer device in a closed position of the gripper elements, the gripper elements in the closed position defining an opening that is aligned with respective openings of the grommets into which respective cable ends are to be fitted.

More specifically, the present invention includes an apparatus having a conveying rail in which the conveying rail includes a grommet-containing buffer, whereby the grommets are stored in a correct position. In alignment with the axis of a vertical bore arranged in the buffer below the first grommet, a singling cylinder with a punch that is movable up and down is arranged above the conveying rail. The apparatus further includes a pivotable fitting cylinder with a grommet-receiving part positioned on a piston rod, arranged below the conveying rail, wherein the grommet is pushed by means of the punch through the vertical bore into the grommet-receiving part and the fitting cylinder is pivoted into an horizontal position. Pivotable gripper elements thereafter surround the grommet-receiving part and form a further bore extending concentrically with the grommet bore. Subsequently, the gripper elements as well as the piston rod and the electrical cable to be fitted are moved, one relative to the other, while the grommet is pushed onto the electrical cable centered by the further bore and assisted by an excess pressure that builds up in the grommet-receiving part.

A number of advantages result from the present invention, including the following.

Loose grommets with minimum preliminary treatment can be processed, the grommets in particular not having to be chalked so that no greater contamination can arise.

The feed apparatus differs from different grommet types only in the shape of the conveying rail. All remaining parts remain substantially the same.

The conveying rail according to the invention represents a simple compact solution for the functions of conveying, sorting and storing, which operates reliably also at greater conveying speeds. Through the monitoring by means of the light barrier and the programmed-controlled blowing-out of the conveying rail, most feed faults are eliminated automatically.

The transparent drum enables an optical checking of the grommet supply and of the feeding operation.

By comparison with the conveying drums mentioned above that are known in the art, longer and slimmer grommets can also be processed, free of faults.

Due to the excess pressure prevailing in the grommet-receiving part, a smaller insertion force results during the pushing of the grommet onto the cable and, thereby, a reduction in the danger of kinking for the cable. Furthermore, the grommet is held free of play and deformed less during the pushing-on operation, so that a more exact positioning on the cable is achieved.

The fitting apparatus can be adapted in a simple manner to different types of grommets without special demands having to be set on the shape of and dimensions of the grommet.

An additional operating step for the stripping of the insulation from the cable ends is saved by the removal of the insulation remnant integrated into the fitting operation.

BRIEF DESCRIPTION OF THE DRAWINGS

The above and additional objects, characteristics, and advantages of the present invention will become apparent in the following detailed description of a preferred embodiment, with reference to the accompanying drawings which are presented as non-limiting examples, in which.

DETAILED DESCRIPTION OF THE PREFERRED EMBODIMENTS

With respect to the drawings, only enough of the construction of the invention has been depicted, to simplify the illustration, as needed for those of ordinary skill in the art to readily understand the underlying principles and concepts of the present invention.

Figure 1:
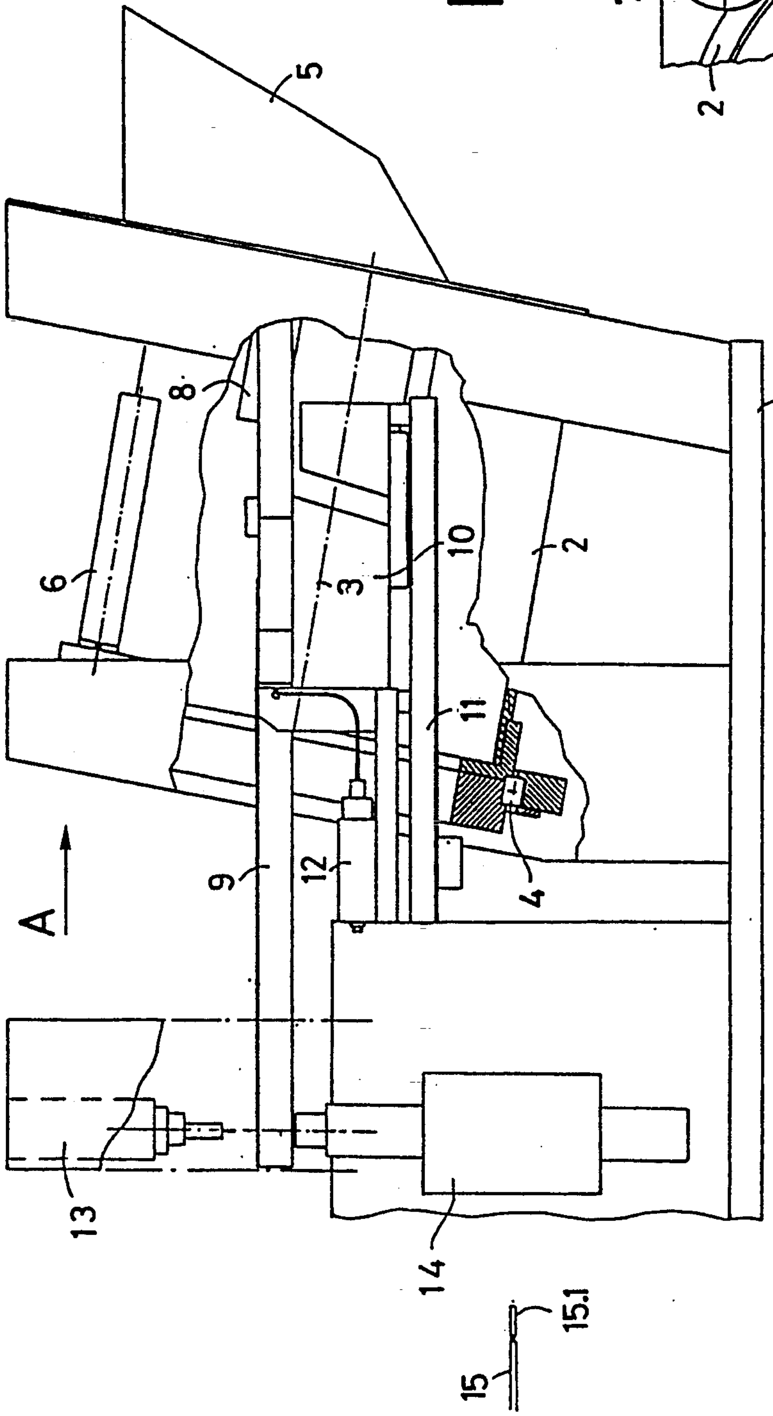
FIG. 1 is a side elevation view, in partial section, of the apparatus according to the invention.
Figure 2:
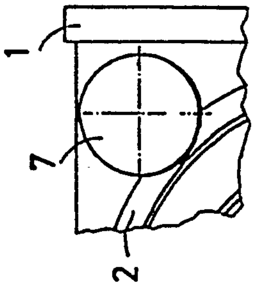
FIG. 2 a partial view of a portion of the apparatus according to FIG. 1 taken in the direction of arrow A.

Turning attention now to the drawings, which illustrate merely exemplary embodiments of the present invention, and initially to FIG. 1, the invention includes a machine frame 1, in which a drum 2 is positioned for rotation by means of a thin-ring bearing 4 about an axis 3 extending inclined to the horizontal. A filling funnel 5 is provided, through which grommets provided for fitting to electrical cables are fed to the drum 2. The funnel 5 is open at an end face and is arranged on the machine frame 1 at the lower end of the drum 2. The drum 2 is driven in rotation by means of a compressed air motor 6 by way of a friction wheel 7, shown in FIG. 2 in driving contact with the drum 2, wherein the rotational speed of the drum 2 can be set by a not further illustrated throttle or other appropriate control means known to those skilled in the art.

Figure 3:
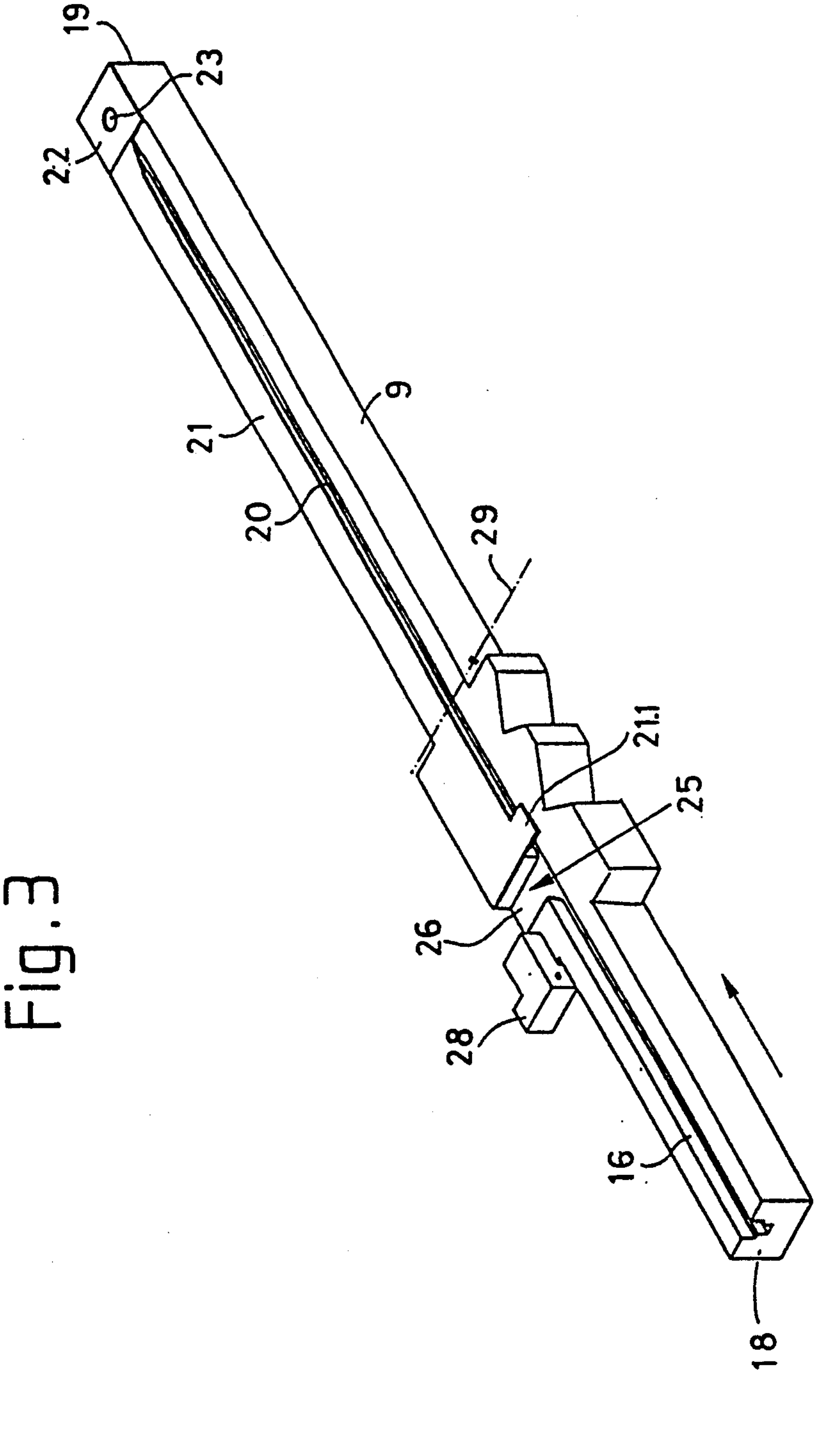
FIG. 3 is a perspective view, and on an enlarged scale, of a conveying rail of the apparatus according to FIG. 1.

By means of scoops 8, which are affixed to the lower end of the interior of the drum, the introduced grommets can be fed to a conveying rail 9 extending into the drum 2 through the open end face at the higher end thereof. The drum 2 is preferably made of a transparent synthetic material so that an optical check of the grommet stock and the feeding operation is possible. The conveying rail 9, which is described in more detail below with reference to FIG. 3, is fastened on a linear vibratory conveyor 10, which is arranged on a part 11 of the machine frame 1. A light barrier or light-activated sensor 12, likewise fastened at the machine frame 1, monitors the function of the conveying rail 9. A grommet singling cylinder or device 13 and a grommet transfer device, i.e., a fitting cylinder or device 14 of a grommet-fitting arrangement is fastened at the machine frame 1 and is described in greater detail below with reference to FIG. 4. An electrical cable 15, which is fed from a cable-processing machine of the grommet-fitting arrangement, includes a portion from which the insulation has preliminarily been removed, although an insulation remnant 15.1 is retained on the cable end for protection of the cable conductor.

Figure 5A:
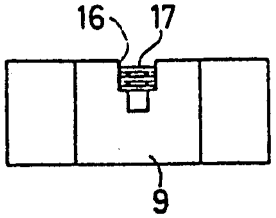
FIGS. 5*a* through 5*e* are different cross-sectional views of the conveying rail according to FIG. 3, illustrating various steps in the sorting operation of the grommets.
Figure 6A:
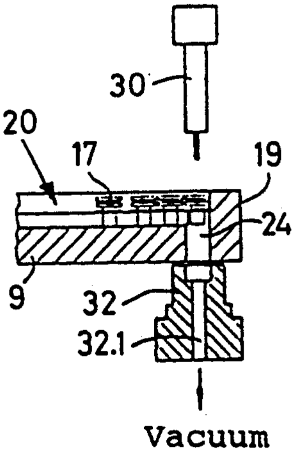
FIGS. 6*a* through 6*d* are different longitudinal sectional views of the end of the conveying rail according to FIG. 3, illustrating the various steps in the singling operation of the grommets.
Figure 5B:
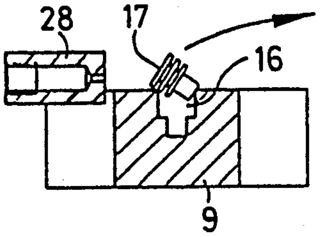
Figure 6B:
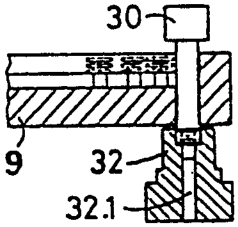
Figure 5C:
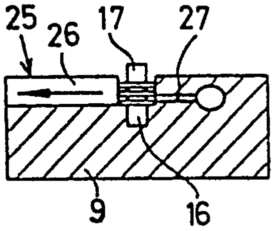
Figure 6C:
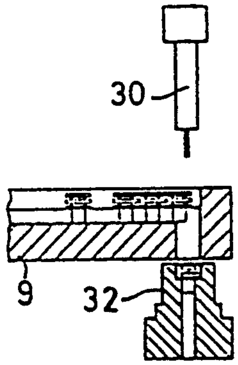
Figure 5D:
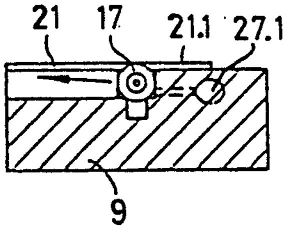
Figure 6D:
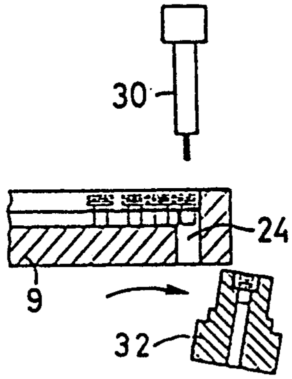
Figure 5E:
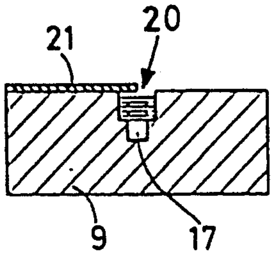

As can be seen in FIG. 3, the conveying rail 9, in a longitudinal direction, includes a groove 16, the cross-section of which corresponds approximately to the outline of the longitudinal section of a grommet 17, as additionally seen, for example, in FIG. 5*a*. The groove 16 is open at the rear or upstream end 18 of the conveying rail 9, while it is closed at the front or downstream end 19, as further seen in FIGS. 6*a* through 6*d*. The part of the groove 16 which is forward in the conveying direction (indicated by the arrow in FIG. 3), serves as a buffer 20, in which grommets are stored in a correct predetermined position and which is covered by a cover plate 21, preferably made of metal. The metal cover plate 21 covers substantially one-half of the groove 16 so that the stored grommets are visible. At the inlet to the buffer 20, the metal cover 21 includes a projection 21.1, which completely covers the groove 16.

The front end 19 of the conveying rail 9 is covered by a plate 22, in which a bore 23 is provided, the axis of which coincides with the axis of the first grommet in the buffer 20. A vertical bore 24, as seen in FIGS. *6a* to *6d*, is provided in the conveying rail 9 beneath the first grommet in the buffer 20, along the axis of bore 23, and likewise coincides with the axis of the first grommet. The diameter of bore 24 is smaller than that of the grommet 17. A sorting buffer plate 20 with a cut-out 26 interrupts the groove 16 at one side and an ejector nozzle 27, as seen in FIG. *5c*, is provided before, i.e., upstream of, the buffer inlet. An ejector nozzle 28 is arranged in front of the sorting baffle plate 25. The light sensor 12, seen in FIG. 1, emits a light beam, symbolized by a chain-dotted line 29, which is projected across the buffer 20 behind the buffer inlet.

Figure 4:
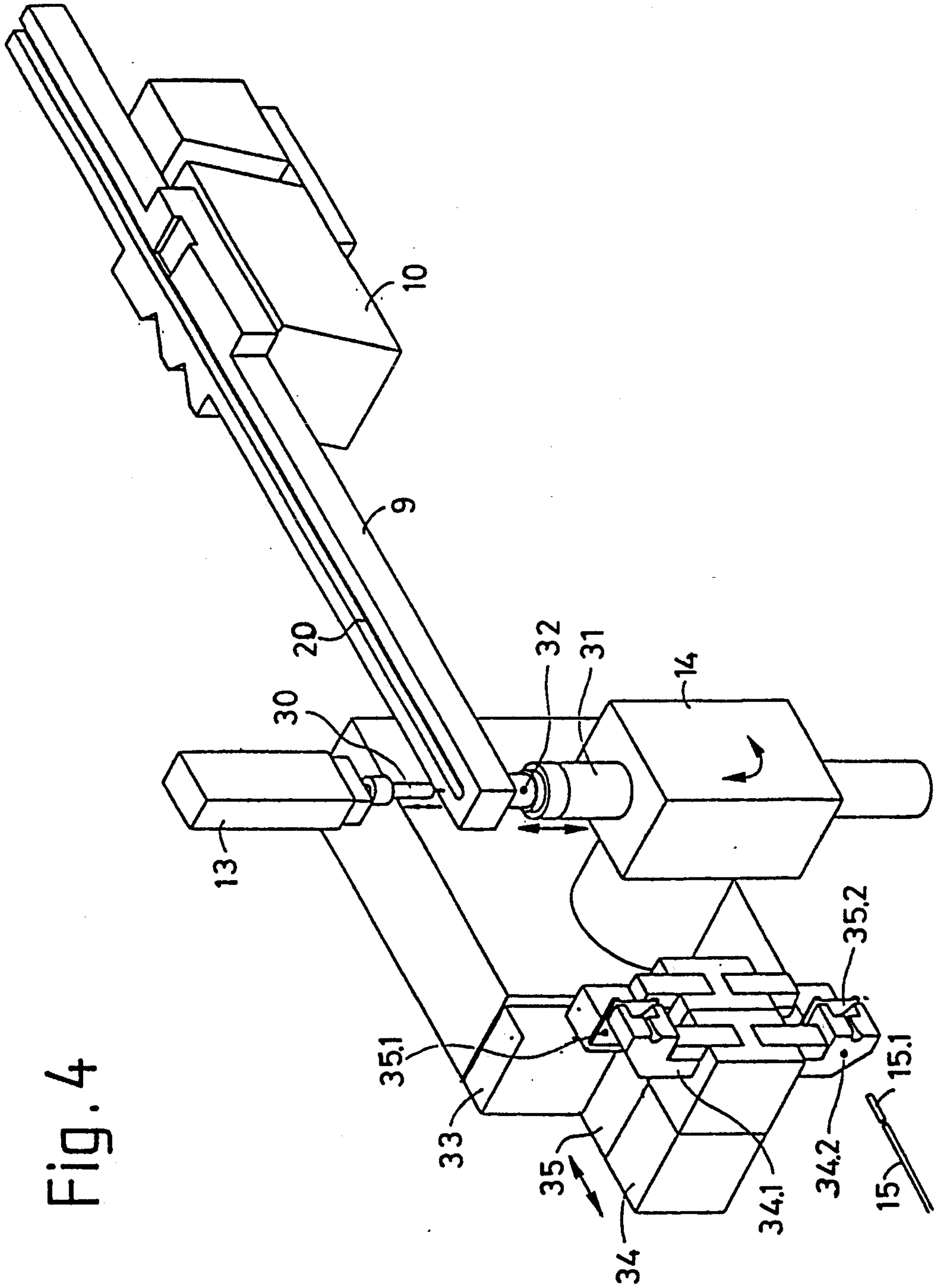
FIG. 4 is a perspective view, and on an enlarged scale, of a grommet-fitting arrangement of the apparatus according to FIG. 1 with the conveying rail according to FIG. 3.

As can be seen in FIG. 4, the singling cylinder or device 13 is arranged above the conveying rail 9, extending along the axis of the bore 23, as seen in FIG. 3, and the vertical bore 24, as seen in FIGS. *6a* through *6d*. The singling cylinder 13 includes a punch 30, which is movable up and down by means of known and suitable type, such as electric and/or fluid driven actuation, for example. The fitting cylinder 14 is arranged beneath the conveying rail 9, extending along the axis of the vertical bore 24. The fitting cylinder or transfer device 14 is mounted for pivoting, as shown by the arcuate double-headed arrow in FIG. 4, and includes a piston rod 31 at which a grommet-receiving part 32 is arranged. The drive and control for providing movement of the cylinder 14 can be of any known and suitable type for the purposes described.

A shown in FIGS. *6a* through *6d*, a bore 32.1 is provided for the reception of a grommet from bore 24. Associated with the bore is a source for providing compressed air or vacuum, so that either a vacuum or an excess pressure can be produced in the interior of the grommet-receiving part 32, as will be further discussed below. A first gripper device 34 and a second gripper device 35 are arranged at a head 33, which is movable to and from in the direction of the double-headed arrow, shown in FIG. 4. The first gripper device 34 includes two pivotable gripper members 34.1 and 34.2, after the inward pivoting of which the grommet-receiving part 32 can be encompassed and a further bore 36, as shown in FIGS. *7b* and *7c*, extending co-axially with the grommet bore 32.1, is formed by means of the two gripper members. The second gripper device 35 includes two pivotable members 35.1 and 35.2, by means of which the insulation remnant 15.1, as shown in FIGS. *7a* through *7f*, can be removed from the cable end, after the inward pivoting of the gripper members. The means necessary to drive and control the grippers can be any known and suitable type for the purposes described herein.

The apparatus described above operates as follows.

The grommets 17 loaded into the filling funnel 5 are fed to the drum 2, wherein they are conveyed upwardly by means of the scoops 8 upon rotation of the drum 2 and partially fall onto the rear or upstream end of the conveying rail 9. At this time, only a portion of the grommets 17 will assume the correct position, as shown in FIG. *5a*. The conveying rail 9, which is set into vibration by the linear vibratory conveyor 10, conveys the grommets 17 in the direction of the higher end of the drum 2. In that event, the grommets move to the ejector nozzle 28, where all grommets that are situated on the conveying rail 9 or that are obliquely positioned on the groove 16 are blown off by a continuous, adjustable air current and fall back into the drum 2, as illustrated in FIG. *5b*. Grommets 17 which stand with their heads upwardly or lie in the groove 16, are blown out by means of the ejector nozzle 27 through the cut-out 26 at the sorting baffle plate 25, as shown in FIG. *5c*. Should a wrongly lying grommet nevertheless not be blown away at the sorting baffle plate 25, it then remains hanging at the projection 21.1 of the metal cover plate 21 at the buffer entry, i.e., its movement along the conveying rail 9 is restrained by means of the projection 21.1, as shown in FIG. *5d*. In this case, the continuous conveying of the grommets 17 disposed in correct position in the buffer store 20, as shown in FIG. *5e*, is interrupted. The sensing of such interruption, by the light sensor 12, results in a brief forceful compressed air pulse by means of a further ejector nozzle 27.1, shown in FIG. *5d*, at the sorting baffle plate 25, to eject the wrongly lying grommet from its position at the projection 21.1, thereby restoring the continuous conveying of correctly positioned grommets along the conveying rail 9.

The respective forwardmost, i.e., the most downstream, grommet 17 in the buffer 20 comes to be positioned above the vertical bore 24, as shown in FIG. *6a*. Due to the vertical movement of the punch 30 as a result of movement of the singling cylinder 13, shown in FIG. 4, the grommet is pushed through the vertical bore 24 into the grommet-receiving part 32, as shown in FIG. *6b*. The bore 32.1 in the grommet-receiving part 32 is evacuated, by means of the aforementioned source, so that the grommet remains securely in the grommet-receiving part 32 due to the suction effect during the subsequent upward movement of the punch 30, as shown in FIG. *6c*. Due to the movement of the succeeding grommets in the conveying rail 9, the next grommet has in the meantime, i.e., during the aforementioned manipulation of the previous grommet by means of the punch 30, assumed the place at the singling point above the vertical bore 24, as shown in FIG. *6d*. At the same time, the fitting cylinder 14, shown in FIG. 4, pivots into the horizontal position, or substantially horizontal position, while the vacuum in the grommet-receiving part 32 prevents the grommet from dropping out.

After the fitting cylinder 14 has been pivoted into the horizontal position, the grommet-receiving part 32 extends coaxially with the cable 15, as shown in FIG. *7a*. The first angle gripper 34 now closes so that the gripper elements 34.1 and 34.2 close upon the grommet-receiving part 32, as shown in FIG. *7b*. Compressed air is then directed at the bore 32.1, whereby it can be ascertained, by a suitable pressure sensor, for example, whether a grommet is situated in the grommet-receiving part 32. If, for some reason, a grommet is not present, further processing can be interrupted, while the fitting cylinder 14 is caused to be returned to receive a further grommet. Subsequently, the fitting cylinder 14 with the piston rod 31 and the head 33 with the angle grippers 34 and 35, shown in FIG. 4, move simultaneously against the cable 15, whereby the grommet 17 is pushed onto the cable 15, as shown in FIG. *7c*. In this case, the further bore 36, which is formed by the gripper elements 34.1 and 34.2, serves to center and guide the cable 15.

Figure 7A:
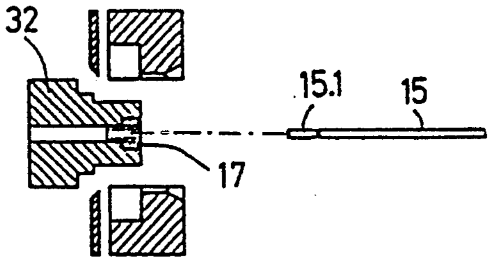
FIGS. 7*a* through 7*f* are different views of the fitting operation or the grommets.
Figure 7B:
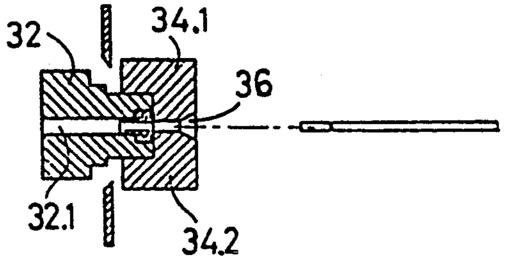
Figure 7C:
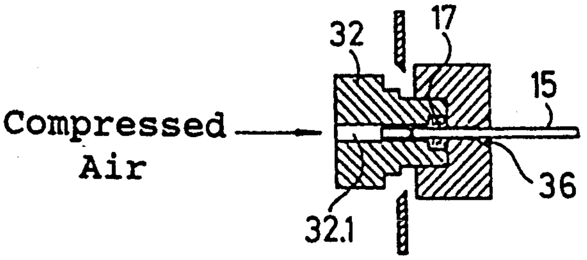
Figure 7D:
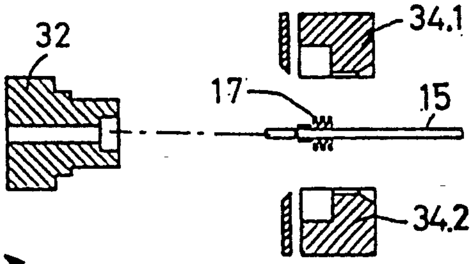
Figure 7E:
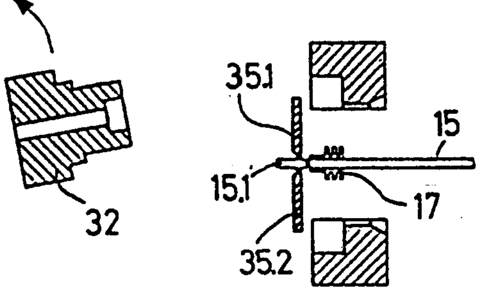
Figure 7F:
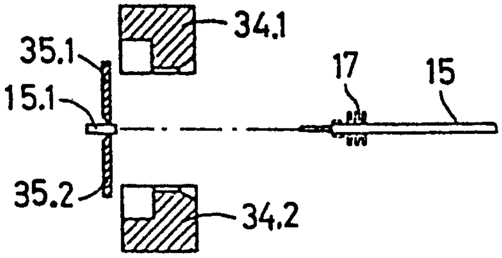

During the operation of pushing the grommet onto the cable end, the bore in the grommet 17 is closed off by the cable 15, whereby an excess pressure can build up in the grommet-receiving part 32, by means of which pressure the cable is more easily inserted due to a relative internal expansion of the grommet and, therefore, an exact position of the grommet 17 on the cable 15 is more easily facilitated. Thereafter, the piston rod 31, shown in FIG. 4, with the grommet-receiving part 32, moves back into the initial position and the gripper elements 34.1 and 34.2 are opened, as shown in FIG. 7*d*. The second gripper device 35 is now closed and the insulation remnant 15.1 is retained between the blades 35.1 and 35.2, as shown in FIG. 7*e*. At the same time, the fitting cylinder 14 with the grommet-receiving part 32 pivots back into the vertical position and is ready for the next singling operation. Thereafter, the head 33 with the gripper devices 34 and 35 (FIG. 4) move back into the initial position, while the insulation remnant 15.1 is removed from the cable 15, shown in FIG. 7*f*, and is transferred to a waste container on the subsequent opening of the blades 35.1 and 35.2 of the gripper device 35.

Figure 8A:
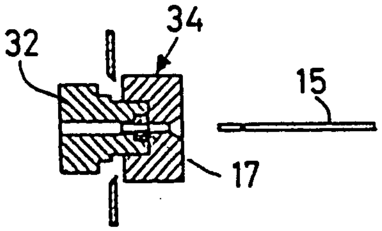
FIGS. 8*a* through 8*g* are different views of a variation of the fitting operation of the grommets.
Figure 8B:
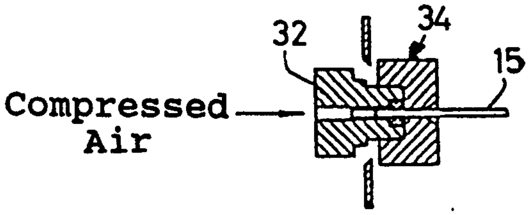
Figure 8C:
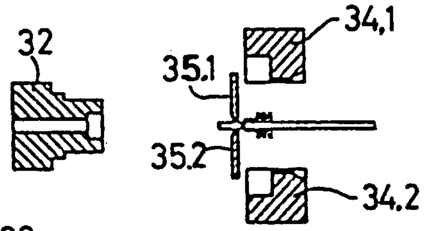
Figure 8D:
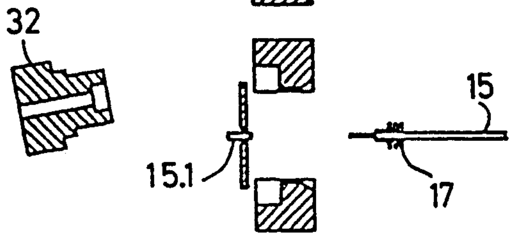
Figure 8E:
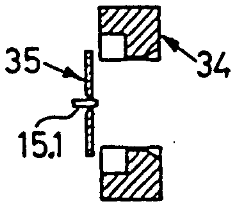
Figure 8F:
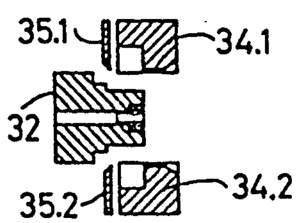
Figure 8G:
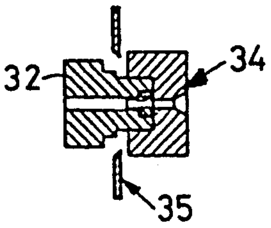

In a variation of the aforementioned operations, the cycle time is shortened, whereby the cable is moved towards the grommet, by means of the fitting operation according to FIGS. 8*a* through 8*g*. In this embodiment, the gripper device 34 with the grommet-receiving part 32 assumes a fixed fitting position already, while the cable 15 is still being advanced, so that the cable can be pushed into the grommet 17 at once, as illustrated in FIGS. 8*a* and 8*b*. Thereafter, the piston rod 31 (FIG. 4) with the grommet-receiving part 32 moves back into the initial position and the gripper elements 34.1 and 34.2 are opened, as shown in FIG. 8*c*. The second gripper device 35 is now closed and the insulation remnant 15.1 is retained between the blades 35.1 and 35.2, as shown in FIG. 8*c*. The fitting cylinder 14 with the grommet-receiving part 32 then pivots back into the vertical position and the electrical cable 15 with the grommet 17 is drawn back, while the insulation remnant 15.1 is removed, as shown in FIG. 8*d*. Subsequently, the head 33 with the gripper devices 34 and 35 (FIG. 4) moves back into the initial setting, as shown in FIG. 8*e*. The insulation remnant 15.1 drops off during the subsequent opening of the blades 35.1 and 35.2 and the grommet-receiving part 32, which has in the meantime been filled again by another grommet 17, is moved again between the gripper elements 34.1 and 34.2 and clamped fast for a new fitting operation, as shown in FIGS. 8*f* and 8*g*.

This application is based upon Swiss Application No. 02 838/91-4, filed on Sep. 25, 1991, the priority of which is claimed and the disclosure of which is hereby expressly incorporated by reference thereto in its entirety.

Finally, although the invention has been described with reference of particular means, materials and embodiments, it is to be understood that the invention is not limited to the particulars disclosed and extends to all equivalents within the scope of the claims.

What is claimed:

1. An apparatus for fitting of grommets to electrical cables, said apparatus comprising:

at least one drum having an interior with an open end face for receiving grommets into the interior, said drum being drivable about an axis inclined to horizontal axis and including scoops arranged in the interior of the drum;

conveying rail, said conveying rail having an upstream end portion and a downstream end portion, said upstream end portion projecting into said drum whereby, while said drum rotates, the grommets are transferred by means of said scoops to said conveying rail for further process, said conveying rail further comprising:

a buffer for storing grommets having been received from said drum having been brought into a predetermined correct position; and a vertical bore is provided in the conveying rail at said downstream end portion below a position in which a first, most downstream, grommet is stored in said buffer;

a singling cylinder having a punch that is mounted for vertical reciprocal movement above the conveying rail and extends substantially along an axis of said vertical bore of said conveying rail;

a pivotable cylinder with a grommet-receiving part positioned on a piston rod, said pivotable cylinder being arranged beneath said conveying rail and extending substantially along the axis of said vertical bore of s id conveying rail, whereby each successive grommet positioned at said downstream end portion is pushed through said vertical bore of said conveying rail into said grommet-receiving part of said pivotable cylinder by means of said punch of said singling cylinder, after which said pivotable cylinder pivots into a substantially horizontal position; and a first gripper device comprising pivotable gripper elements for gripping said grommet-receiving part of said pivotable cylinder upon pivotal movement to surround said grommet-receiving part, said pivotable gripper elements forming a further bore as said gripper elements surround said grommet-receiving part, said further bore extending substantially concentrically with said grommet bore, wherein said first gripper device and said piston rod of said pivotable cylinder and the electrical cable to be fitted with a grommet are adapted to be moved one relative to the other while the grommet is pushed onto the electrical cable, the electrical cable being centered by the further bore, until the grommet is moved to a predetermined position on the electrical cable.

2. The apparatus according to claim 1, wherein:

said first gripper device and said grommet-receiving part comprise means for receiving the electrical cable being pushed into the grommet while said gripper device and said grommet-receiving part are maintained stationary.

3. The apparatus according to claim 2, wherein:

said grommet-receiving part includes a bore, said bore of said grommet-receiving part is generally coextensive with a bore of the grommet, said apparatus further comprising a source of compressed air connected to said bore of said grommet-receiving part, whereby the grommet after insertion into said grommet-receiving part is retained by vacuum and the presence of a grommet in said grommet-receiving part is checked before the introduction of the cable by excess pressure, wherein the excess pressure is maintained until the grommet reaches said predetermined position on the cable.

4. The apparatus according to claim 1, further comprising:

means for moving said gripper device and said grommet-receiving part for pushing the grommet onto the electrical cable while the electrical cable is maintained stationary.

5. The apparatus according to claim 1, further comprising:

a second gripper device comprising a pair of pivotable blades, whereby the electrical cable to be fitted with a grommet has an end that includes insulation in which the end is partially stripped of insulation and an insulation remnant remains on the cable end, wherein said blades of said second gripper device, after retraction of said piston rod of said pivotable cylinder and said grommet-receiving part as well as the opening of said gripper elements of said first gripper device, pivot toward each other and clamp the insulation remnant so that the insulation remnant is removed from the electrical cable end on a relative movement of the second gripper device against the electrical cable.

6. The apparatus according to claim 1, wherein:
said conveying rail comprises a longitudinally extending groove, said groove having a transverse cross-section corresponding approximately to the outline of a longitudinal section of a grommet, said downstream portion of said conveying rail comprising said buffer;
said apparatus further comprises:
a cover plate covering said buffer and positioned to prevent movement of grommets along said conveying rail and into said buffer that are not in said predetermined correct position;
a sorting baffle with a cut-out interrupting said groove at one side and a first ejector nozzle provided adjacent an upstream inlet of said buffer;
a second ejector nozzle provided upstream of said sorting baffle; and
a light sensor for monitoring a continuous inflow of grommets into said buffer, said light sensor being arranged downstream of said buffer inlet, and a third ejector nozzle which opens into said sorting baffle.

7. The apparatus according to claim 1, wherein:
said vertical bore in said conveying rail has a diameter that is smaller than a diameter of the grommet.

8. The apparatus according to claim 1, wherein:
said drum is made of a transparent synthetic material.

9. An apparatus for the fitting of grommets to cables, said apparatus comprising:
a feeding arrangement for feeding grommets to a fitting arrangement, wherein:
said feeding arrangement comprises:
a conveying rail having an upstream portion and a downstream portion, said conveying rail conveying grommets from an upstream to a downstream direction, said conveying rail further comprising a buffer for storing grommets that are each oriented in a predetermined correct position for subsequent sequential processing of respective grommets by means of said fitting arrangement; and
a grommet transfer guide provided at said downstream end portion of said conveying rail adjacent a position in which a first, most downstream, grommet is stored in said buffer, for guiding said most downstream grommet as said grommet is transferred from said conveying rail to said fitting arrangement;
said fitting arrangement comprises:
a grommet singling device for sequentially removing a most downstream grommet from said grommet transfer guide;
a grommet transfer device for sequentially transferring a respective grommet, upon removal from said buffer, to a grommet fitting station, said grommet transfer device comprising a grommet-receiving part upon which a grommet is receive and held during said transferring by said transfer device; and
a first gripper device located at said grommet fitting station, said first gripper device comprising gripper elements for gripping said grommet-receiving part of said grommet-transfer device in a closed position of said gripper elements, said gripper elements in said closed position defining an opening that is aligned with respective openings of said grommets into which respective cable ends are to be fitted.

10. The apparatus according to claim 9, wherein:
said first gripper device and said grommet-receiving part comprise means for receiving the cable being pushed into the grommet while said first gripper device and said grommet-receiving part are maintained stationary.

11. The apparatus according to claim 10, wherein:
said grommet-receiving part includes a bore, said bore of said grommet-receiving part is generally coextensive with a bore of the grommet, said apparatus further comprising means for selectively communicating an over-pressure or under-pressure of air to said bore of said grommet-receiving part, whereby the grommet is retained on said grommet-receiving part by means of an under-pressure of air communicated to said bore of said grommet-receiving part and, whereby an over-pressure of air is maintained in said bore of said grommet-receiving part until the grommet reaches a predetermined location on the cable.

12. The apparatus according to claim 9, further comprising:
means for moving said gripper device and said grommet-receiving part for pushing the grommet onto the electrical cable while the electrical cable is maintained stationary.

13. The apparatus according to claim 9, further comprising:
a second gripper device comprising a pair of pivotable gripper elements, whereby each of the electrical cables to be fitted with respective grommets has an end that includes insulation in which the end is partially stripped of insulation and an insulation remnant remains on the cable end, wherein said gripper elements of said second gripper device, comprise means for stripping said insulation remnant from said cable end after said grommet is fitted upon said cable.

14. The apparatus according to claim 9, wherein:
said conveying rail comprises a longitudinally extending groove, said groove having a transverse cross-section corresponding approximately to the outline of a longitudinal section of a grommet, said downstream portion of said conveying rail comprising said buffer;
said apparatus further comprises:
a cover plate covering said buffer and positioned to prevent movement of grommets along said conveying rail and into said buffer that are not in said predetermined correct position;
a sorting baffle with a cut-out interrupting said groove at one side and a first ejector nozzle provided adjacent an upstream inlet of said buffer;

a second ejector nozzle provided upstream of said sorting baffle; and a light sensor for monitoring a continuous inflow of grommets into said buffer, said light sensor being arranged downstream of said buffer inlet, and a third ejector nozzle which opens into said sorting baffle.

15. The apparatus according to claim 9, wherein:

said grommet transfer guide comprising a bore in said conveying rail, said bore in said conveying rail having a diameter that is smaller than a diameter of the grommet.

16. The apparatus according to claim 9, wherein:

said drum is made of a transparent synthetic material.

* * * * *